(12) United States Patent
Miani et al.

(10) Patent No.: US 9,500,410 B2
(45) Date of Patent: Nov. 22, 2016

(54) ELECTRIC ARC FURNACE

(75) Inventors: Stefano Miani, Udine (IT); Bruno Rubeo, Udine (IT)

(73) Assignee: SMS Concast Italia S.p.A. Con Socio Unico, Udine (IT)

( * ) Notice: Subject to any disclaimer, the term of this patent is extended or adjusted under 35 U.S.C. 154(b) by 1181 days.

(21) Appl. No.: 13/201,703

(22) PCT Filed: Mar. 31, 2009

(86) PCT No.: PCT/IT2009/000128
§ 371 (c)(1),
(2), (4) Date: Feb. 13, 2012

(87) PCT Pub. No.: WO2010/113189
PCT Pub. Date: Oct. 7, 2010

(65) Prior Publication Data
US 2012/0134384 A1 May 31, 2012

(51) Int. Cl.
| | | |
|---|---|---|
| F27D 11/08 | (2006.01) | |
| F27B 3/08 | (2006.01) | |
| C21C 5/52 | (2006.01) | |
| F27B 3/18 | (2006.01) | |
| F27B 3/19 | (2006.01) | |
| F27D 1/18 | (2006.01) | |
| F27D 3/14 | (2006.01) | |
| F27D 3/15 | (2006.01) | |
| F27D 1/02 | (2006.01) | |

(52) U.S. Cl.
CPC .............. *F27B 3/085* (2013.01); *C21C 5/527* (2013.01); *C21C 5/5211* (2013.01); *F27B 3/183* (2013.01); *F27B 3/19* (2013.01); *F27D 1/02* (2013.01); *F27D 1/1816* (2013.01); *F27D 3/14* (2013.01); *F27D 3/15* (2013.01); *C21C 2005/5282* (2013.01); *Y02P 10/216* (2015.11)

(58) Field of Classification Search
USPC ................................................... 373/60–108
See application file for complete search history.

(56) References Cited

U.S. PATENT DOCUMENTS

| | | | |
|---|---|---|---|
| 3,745,224 A * | 7/1973 | Ames | 373/84 |
| 4,181,812 A * | 1/1980 | Collin | 373/75 |
| 4,466,104 A | 8/1984 | Walzel | |
| 4,537,551 A | 8/1985 | Krogsrud | |
| 5,054,033 A | 10/1991 | Wronka et al. | |
| 5,410,565 A | 4/1995 | Blum et al. | |
| 6,418,157 B1 * | 7/2002 | Fox | 373/74 |
| 2004/0239014 A1 | 12/2004 | Fuchs | |

FOREIGN PATENT DOCUMENTS

WO  00/70285  11/2000

OTHER PUBLICATIONS

Vallomy, "Energy and Environment Make Consteel the Choice in USA and Japan", Steel Times Internationa, DMG World Media, Lewes, GB, vol. 15, No. 2, Mar. 1, 1991, p. 30, 32, XP000179080.

\* cited by examiner

*Primary Examiner* — David Angwin
*Assistant Examiner* — Amit K Singh
(74) *Attorney, Agent, or Firm* — Davis & Bujold PLLC; Michael J Bujold

(57) ABSTRACT

An electric arc furnace has a chamber suitable for containing molten steel, a roof covering the chamber and for containing a mass of scrap steel, electrodes for melting the mass of scrap, and a supporting base. The base permits the chamber to oscillate around a horizontal axis of rotation. The roof and the chamber are counterprofiled in correspondence to the respective interface walls to create a rotary coupling with regard to the axis of rotation. The roof, during oscillation of the chamber, remains fixed with regard to the base as well as in a closed position with regard to the chamber.

26 Claims, 6 Drawing Sheets

ELECTRIC ARC FURNACE

FIELD OF THE INVENTION

This invention concerns an electric arc furnace optimised for continual feed functioning.

BACKGROUND OF THE INVENTION

It is well known that steel is produced today through three fundamental procedures.

The first procedure is called integrated cycle or primary steelmaking. Here the ferrous mineral (usually an iron oxide, in particular $Fe_2O_3$), by means of the blast furnace where it comes into contact with coke and other additives (mainly $CaCO_3$) is transformed into pig iron. Downstream of the blast furnace the pig iron is worked to reduce the percentage of carbon and thus convert it into steel.

A second cycle in steelmaking, known as secondary steelmaking, sets out from scrap to regenerate it and obtain new steel. The heart of this steelmaking is the electric arc furnace (EAF) where the scrap is melted. Downstream of the electric furnace subsequent work processes result in semi-manufactured product.

Then there is an intermediate procedure which consists in direct reduction of the iron oxides to metallic iron, without fusion of the latter. In this way so called sponge iron is obtained, also known as Direct Reduced Iron (DRI). This sponge may then be worked to remove impurities (e.g. inclusion of inert elements) and form hot briquetted iron (HBI) with which to feed the secondary steelmaking cycle.

Currently global steel production is equally divided between primary and secondary steelmaking while the amount of steel produced using raw material from direct reduction is decidedly less.

Each of the procedures described above has its pros and cons. For example primary steelmaking calls for considerable initial investments due to the costs of a blast furnace and the necessary infrastructures for raw materials supply. On the other hand a blast furnace has relatively low management costs and great production capacity, in the order of several thousand tonnes of pig iron a day.

Moreover, steel obtained from primary steelmaking is usually of excellent quality and is preferred for many uses. For example in a sector of strategic importance like the automobile industry, blast furnace steel is clearly preferred. In fact in car manufacture the working of relatively thin sheet metal and the conformation of fairly narrow curves must give aesthetically pleasing results. These features are guaranteed with the use of blast furnace steel.

Secondary steelmaking is in fact based on plant smaller than the blast furnace. So the individual plant requires less initial investment but has lower production capacity, usually in the order of some hundreds or a few thousand of tonnes of steel a day.

An ordinary EAF consists essentially of a lower chamber to collect the molten steel, an upper chamber consisting of cooled panels which generates the material to be loaded, a retractable roof through which three electrodes enter the furnace and an exhaust suction system.

The electric arc furnace has considerable advantages over the blast furnace. Firstly, it is fed chiefly by scrap, thus playing a fundamental role in recycling raw material, with clear environmental advantages. Moreover the EAF has evolved continually over the last forty years into an extremely efficient system. In particular there have been progressive improvements in energy efficiency and continual reductions in management costs and environmental impact.

These indubitable advantages of secondary steelmaking however are countered by certain negative aspects, above all due to the fact that the ordinary melting cycle that takes place in an electric arc furnace involves power off times in which the furnace is not functioning.

Currently the average cycle of an EAF is around 40-60 minutes from tap to tap. During a single cycle the furnace melts on average the contents of two or three feed baskets.

Feeding in the contents of each basket requires that the electrodes be switched off and removed and the retractable roof of the furnace raised. These operations involve an overall power off time of about 10-20% of cycle duration.

Furthermore the volume of each basket is practically equal to that of the furnace. A certain mass in scrap in fact occupies a far greater volume (roughly ten times) that it does in the state of molten steel.

This is why electric furnaces of the well known kind comprise, above the bowl for collecting the molten steel, an upper chamber for the great volume of scrap inserted at each loading. While the bowl has a refractory lining the upper chamber is usually in metal panels, suitably cooled. It should be pointed out that about 10-15% of the total energy introduced into the furnace is removed and dispersed in the form of heat for cooling the cooled parts.

Lastly, at the moment of tapping, electric furnaces of the well known kind are tipped up to pour the melt out through a special aperture. In this operation the roof is kept closed to avoid excessive heat dispersion. During tapping the roof remains closed and the electric power supply is switched off.

Given the foregoing, in furnaces of the well known kind the position of the exhaust system intake on the roof is limited to one position only. It must be placed in such a way as to coincide with the axis of the sleeve of the exhaust suction tubing downstream of the furnace. This configuration prevents the conduit from maintaining its position during tapping.

It should be pointed out that the exhaust system carries off about 2% of the mass loaded into the furnace from the baskets. Dust, the lightest shavings and the smallest fragments of metal may easily be sucked in with the exhaust gases. This means a clear loss of steel produced and extremely strenuous working conditions for the suction plant filters.

There are well known solutions for loading the furnace, not with baskets but with continuous feed systems such as mechanical loaders, conveyor belts and similar. The furnace loading points are in the upper chamber, therefore it is loaded from the side of the furnace or from above through the roof.

Though with these solutions there is no longer a need to open the roof for loading, mechanical loaders or conveyor belts—as well as the electrodes in certain cases—must be removed at the moment of tapping to avoid interference.

Moreover if the furnace feed hatch is at the side, over and above the mechanical difficulties mentioned previously there is a clear thermal unbalance due to the lateral position (asymmetrical) of the material to be melted. And since the loading hatch is close to the level of the melt, it is subject not only to a considerable thermal load but also to the risk of being filled with slag during the uncontrolled reactions that take place inside the furnace. Where loading is done through the roof there are further problems such as: the loading position close to the exhaust intake; the height from which the scrap is dropped causing spurts of molten material, and the considerable plant engineering complications of a roof which, as we recall, must rotate or roto-translate with the furnace during tapping and deslagging operations. Furthermore the propinquity of the loading hatch to the exhaust intake increases the percentage of fine material aspirated.

SUMMARY OF THE INVENTION

So the purpose of this invention is to produce an electric arc furnace which overcomes the problems pointed out with regard to the state of the art.

This purpose and these tasks are achieved by an electric arc furnace according to the present invention.

BRIEF DESCRIPTION OF THE DRAWINGS

Further features and advantages of this invention will be made clearer by the description of certain examples of embodiment below, by way of example and not limitative, with reference to the following figures in which.

DETAILED DESCRIPTION OF THE INVENTION

Figure 1:
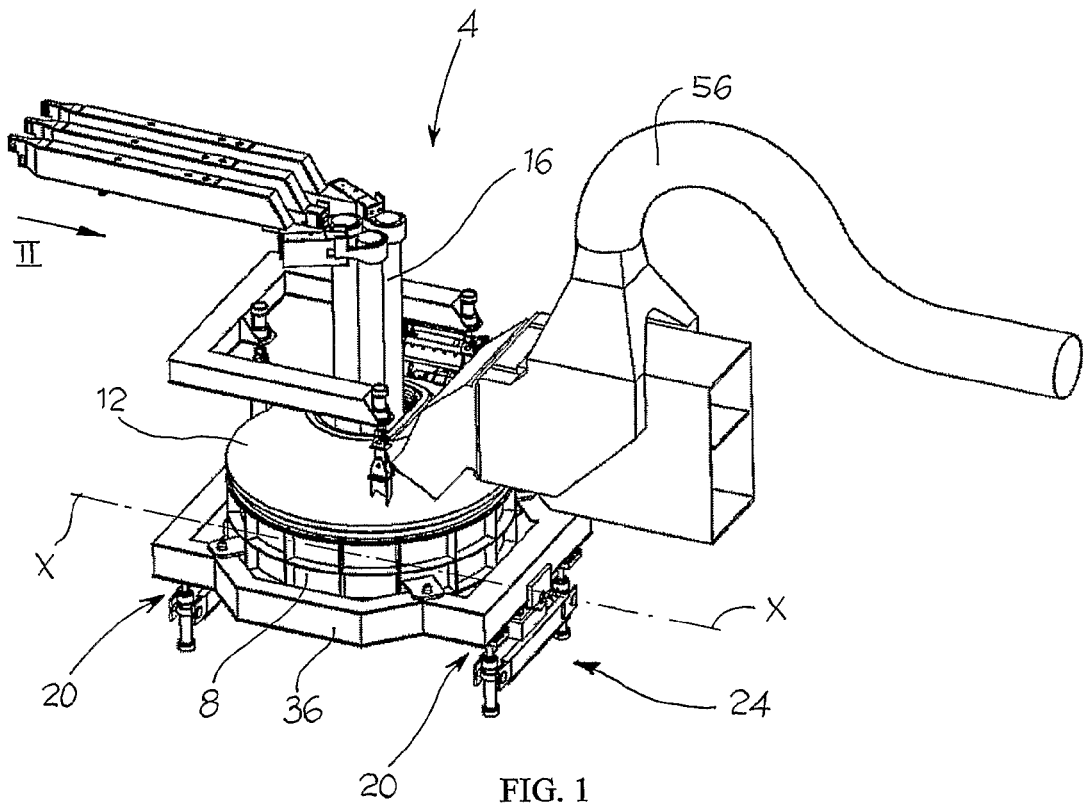
FIG. 1 is a perspective view of an electric arc furnace according to an embodiment of this invention.
Figure 2:
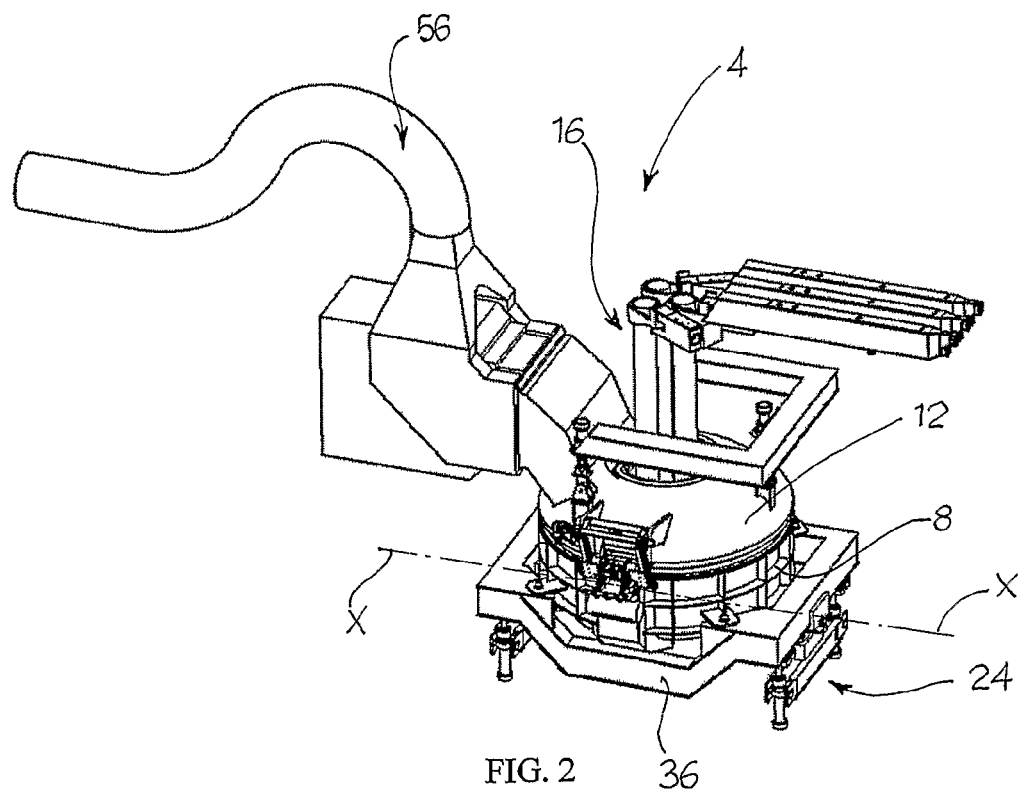
FIG. 2 is a perspective view of the furnace in FIG. 1, from the side of arrow II of FIG. 1.
Figure 3:
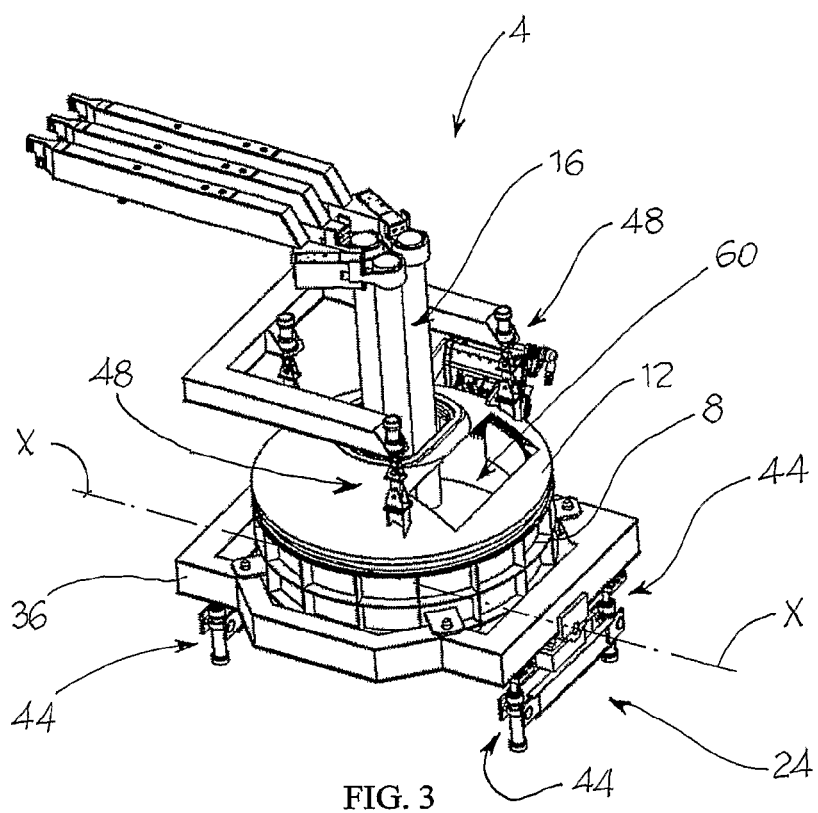
FIG. 3 is a perspective view of the furnace in FIG. 1 in which certain aspects have been omitted to highlight several details of the furnace.

With reference to the figures: N° 4 indicates overall an electric arc furnace (EAF) for melting scrap steel.

Furnace 4 comprises a chamber 8 for molten steel and a roof 12 which interfaces with and covers chamber 8, as well as containing a mass of scrap steel. Chamber 8 is preferably lined with refractory material for containing molten steel.

The furnace 4 also comprises at least one electrode 16 to supply heat for meltdown of the mass of scrap steel. According to a possible embodiment the furnace 4 may comprise at least one injector 18.

Preferably the furnace comprises a plurality of electrodes 16, for example three laid out like the apices of a triangle which intercept the internal volume of chamber 8 in such a way as to supply heat for melting steel.

The furnace 4 comprises support means 20 for chamber 8 on base 24. Support means 20 are suitable for supporting chamber 8 and also allowing its oscillation around a horizontal rotation axis X-X shown in FIGS. 1-3 and 8-10. Preferably the support means 20 on base 24 bear only chamber 8 and are suitable for allowing its oscillation for tapping and deslagging. In other words, support means 20 support only chamber 8 during rotation, whereas the roof is mechanically independent of or separate from the said support means 20. Moreover roof 12, during oscillation of chamber 8, remains fixed with regard to base 24. Advantageously, during oscillation of chamber 8 the axis of rotation X-X of chamber 8 remains fixed with regard to base 24.

Advantageously, roof 12 and chamber 8 are coupled in correspondence to reciprocal interface walls 30 which produce a seal airtight to the fusion gases developed in chamber 8.

Advantageously, roof 12 and chamber 8 are mutually counterprofiled in correspondence to the said interface walls 30 to create a rotoidal type of coupling with regard to the axis of rotation X-X of chamber 8 in such a way that, maintaining roof 12 fixed with regard to base 24, it is possible to carry out oscillation of chamber 8 around axis of rotation X-X to facilitate tapping and/or deslagging operations as better described below.

According to a possible embodiment, interface walls 30 are conformed according to a spherical or cylindrical surface whose lines are parallel to the said axis of rotation (X-X) of chamber 8.

Preferably, between interface walls 30 of chamber 8 and roof 12, there is a cavity or clearance 32 to accommodate thermal and mechanical deformations respectively. Preferably, to remove incrustations of slag that inevitably form on the roof, the terminal or interfacing part of the chamber is formed in such a way as to remove slag with a cutting action (spur).

In furnace 1 according to the invention, roof 12 is formed in such a way as to maintain a constant distance from the top of the interface walls of chamber 8, both when it is stationary for the melting cycle and when it rotates for tapping and/or deslagging.

The predefined distance between roof 12 and the walls of chamber 8 is such as to guarantee a sufficient seal for the gases developed inside the furnace and at the same time allow the dilations typical of the functioning cycles of the furnace itself.

According to a possible embodiment, in correspondence to at least one of the said interface walls 30 there are lock guides to further limit the escape and dispersion of gas from chamber 8.

According to certain embodiments of furnace 4 as per the invention, the plan of furnace 4 and the position of electrodes 16 are defined according to a geometrical diagram that ensures a regular charge of heat within chamber 8.

For example, the plan of furnace 4, and in particular of chamber 8 and roof 12 according to the invention, preferably has a circular, elliptical or pseudo-elliptical form. A pseudo-elliptical form may be for example a form approximated by means of an ellipse but comprised of arcs of circles of differing radii and/or by interconnected straight segments.

Electrodes 16 are positioned in correspondence to a thermal barycentre of chamber 8 that depends on the geometrical form thereof. For example in the case of a circular form the electrodes 16 are set near the centre of the plan of chamber 8 (for the three-phase furnace the electrodes are set at the apices of an equilateral triangle) and in the case of an elliptical form the electrodes 16 are set, for example, close to the foci of the elliptical plan of chamber 8 (for the three-phase furnace the electrodes are set at the apices of an isosceles triangle).

Support means 20 identify a fixed axis of rotation X-X for chamber 8 during rotation of the chamber itself.

Advantageously, the said axis of rotation X-X lies between base 24 of furnace 4 and interface walls 30 of chamber 8.

For example, support means 20 comprise a perimeter frame 36 which surrounds chamber 8 and keeps it suspended around the axis of rotation X-X.

According to one embodiment, the perimeter frame 36 comprises a pair of rotating pins 40 mounted on appropriate supports. Rotating pins 40 define the axis of rotation X-X of chamber 8.

In particular, the said axis of rotation X-X is set at a height lower than the said interfaces 30, below perimeter frame 36.

The furnace 4 further comprises motors suitable for rotating chamber 8 with regard to support means 20.

According to one embodiment, the motors comprise at least one cylinder-piston unit 44, operationally connected with perimeter frame 36 to turn chamber 8 around the said axis of rotation X-X.

Chamber 8 can therefore be rotated from a tapping position, in correspondence with which it taps the melt (FIG. 9), to an opposite position of deslagging (FIG. 10), the said positions being opposite with regard to the axis of rotation X-X of chamber 8.

Preferably roof 12 is movable from a lowered position, for closure of chamber 8, to a raised position, translated or rotated, for the insertion in chamber 8 of a basket of material to be melted. In fact it may be necessary to introduce scrap that can no longer be broken down, such as for example large monolithic pieces. Moreover, if roof 12 can be opened it is useful for occasions when it necessary to gain access to the internal furnace, e.g. for maintenance and suchlike.

To this end roof 12 is equipped with lifting means 48 suitable for lifting and/or shifting the said roof 12 with regard to chamber 8. Preferably the lifting means 48 support roof 12 with the related accessories throughout the functioning of furnace 4. So the roof is supported by the said lifting means 48 and not by support means 20 which instead support chamber 8.

Therefore lifting means 48 of roof 12 are mechanically and kinematically independent of support means 20 of chamber 8, so chamber 8 and roof 12 are also mechanically and kinematically independent.

It is also possible to mount support frame 49 for roof 12 on which lifting means 48 are installed on tracks to guide shifting by external actuators. According to a further embodiment, support frame 49 may be rotated to permit access to chamber 8 and to a basket, or for maintenance work.

According to one embodiment, lifting means 48 comprise hydraulic cylinders and pistons.

Preferably roof 12 comprises electrodes 16 and the related supports.

Preferably roof 12 also comprises exhaust suction means 56.

Preferably roof 12 comprises at least one feed hatch 60 for feeding chamber 8 with scrap, DRI/HBI etc.

For example, feed hatch 60 is located in correspondence to exhaust suction plant 56 in such a way as to convey the said exhaust gases onto the scrap to be melted, preheating it before it goes into chamber 8.

According to certain embodiments, furnace 4 comprises means for continuous feeding of scrap to the furnace. These means of continuous feeding (not illustrated) may for example comprise conveyor belts or vibrating transporters or oscillating plates, depending on specific requirements.

These feeders replace the well known loading baskets and ensure a continual supply of scrap to furnace 4. In other words, the mass of scrap steel to be treated in a melting cycle is not introduced into furnace 4 in two or three different moments with baskets but is brought gradually with an ongoing flow.

In some embodiments of furnace 4 according to the invention with continuous feed, chamber 8 is distinctly smaller than the chambers of similarly sized furnaces with traditional and/or continuous loading.

The traditional loading of each basket means that the volume introduced into the furnace is substantially equal to basket volume.

Continuous loading of scrap means that this need is avoided. The great volume occupied by scrap steel to be melted is distributed in a continuous flow rather than unloaded from the basket in two or three distinct phases. The volume introduced into the furnace a little at a time is gradually reduced as the scrap melts.

From feed hatch 60 the scrap falls by gravity into chamber 8. Positioning of the feed hatch 60 is preferably chosen in such a way that the scrap falls close to the thermal barycentre of the furnace, which in the case of an AC furnace coincides with the triangle formed by electrodes 16. This solution is particularly advantageous because it almost totally avoids the imbalances generated by the accumulation of a considerable mass of scrap in a lateral area of chamber 8.

As described, chamber 8 of furnace 4 in this invention has such a reduced height as not to require large size traditional cooled panels: cooled blocks, preferably small size in copper, might be installed above the refractory material.

In fact chamber 8 according to the invention, being of reduced volume, also has a smaller heat exchange surface and therefore may not require the use of cooled panels. So in comparison with the upper cooled chamber of a traditional furnace, less energy in the form of heat is dispersed.

Preferably chamber 8 is created in a single piece.

Figure 12:
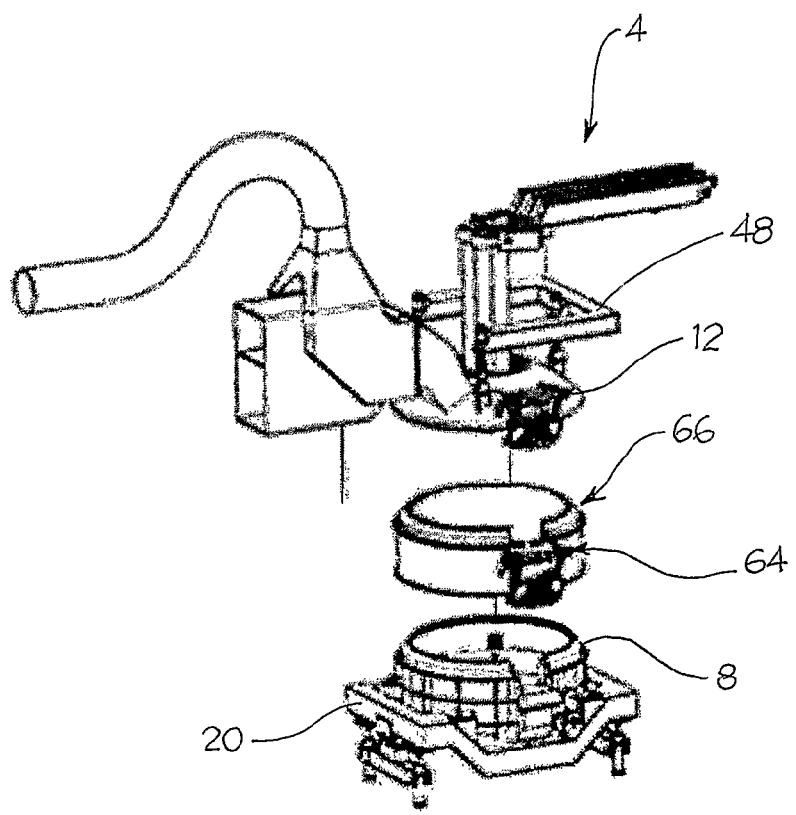
FIG. 12 is a perspective view, in separate parts, of a furnace according to a further form of embodying this invention.

According to a further embodiment of this invention (FIG. 12), to adapt it to any situation of using the furnace with scrap baskets and not continuous feed, furnace 4 comprises a cage 64 inserted between chamber 8 and roof 12, designed to increase the load volume of chamber 8, carrying out in fact the function of the traditional upper chamber. An upper portion 66 of the said cage 64 is counterprofiled with the interface wall 30 of roof 12 in such a way as to create a rotoidal coupling with the roof itself along the axis of rotation X-X. In this case the whole roof support system 48,49 and roof 12 itself is shifted to a level superior to the height of cage 64.

Cage 64 may comprise cooling panels.

Figure 4:
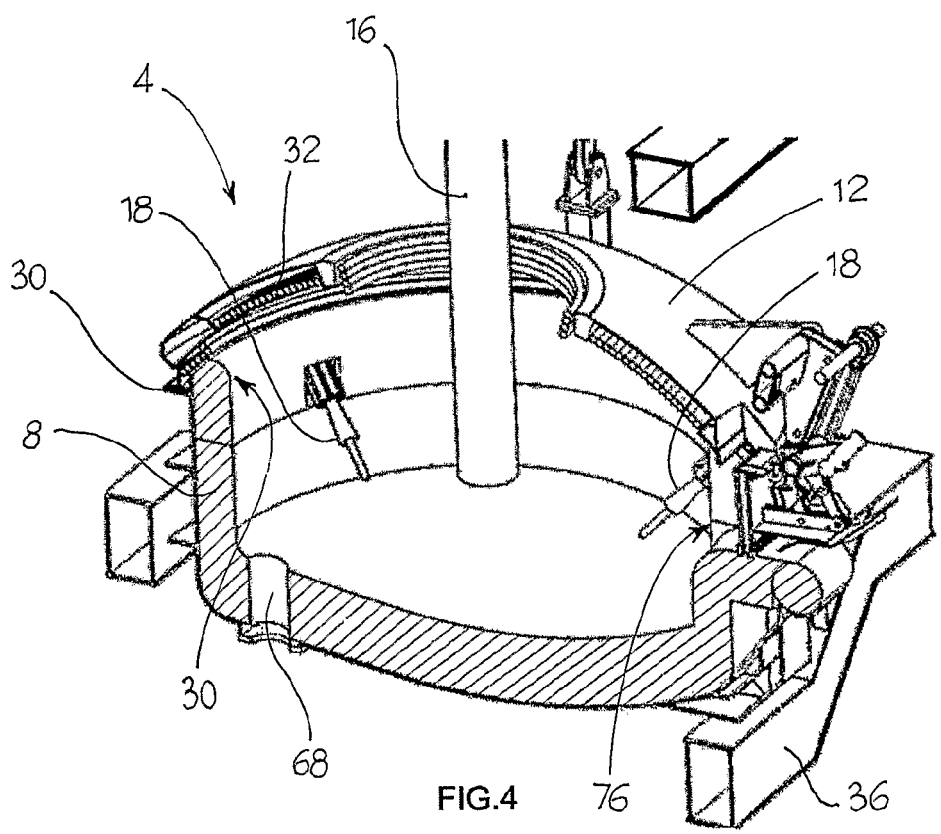
FIGS. 4 and 5 are perspective views, partially in section, of several details of the furnace in FIG. 1.
Figure 5:
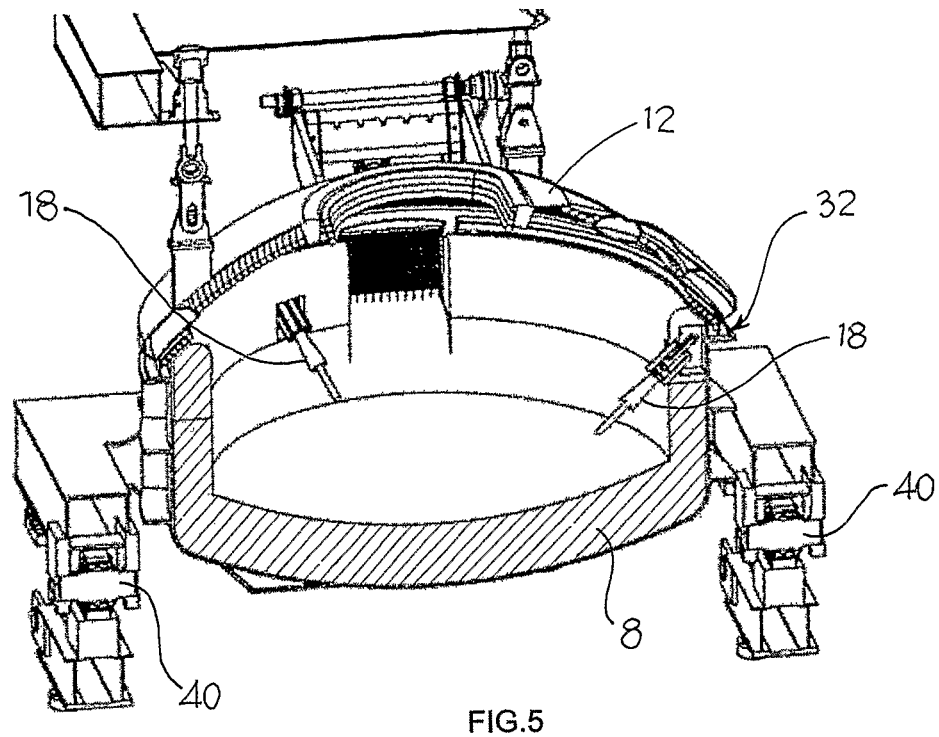
Figure 6:
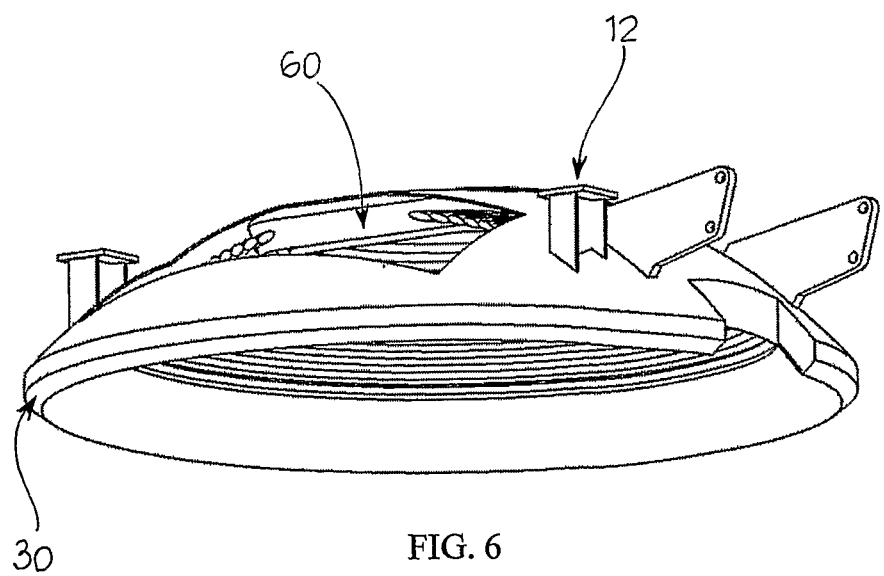
FIGS. 6 and 7 are perspective views of details of the furnace in FIG. 1.
Figure 7:
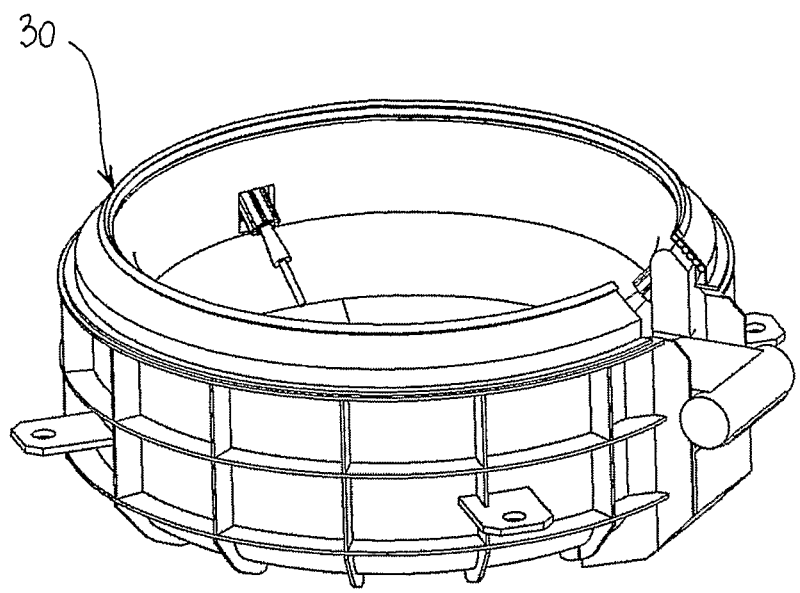
Figure 8:
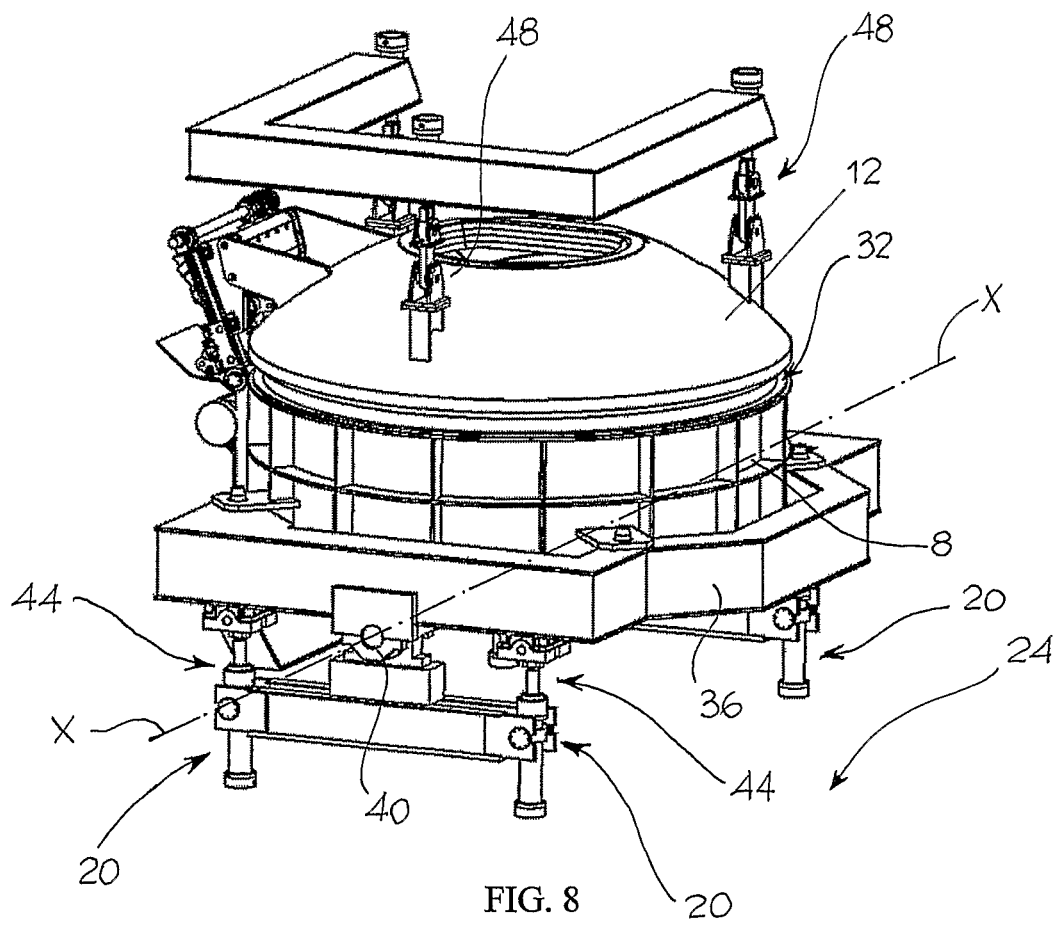
FIG. 8 is a perspective view of the furnace in FIG. 1 in an operational configuration of normal functioning.
Figure 9:
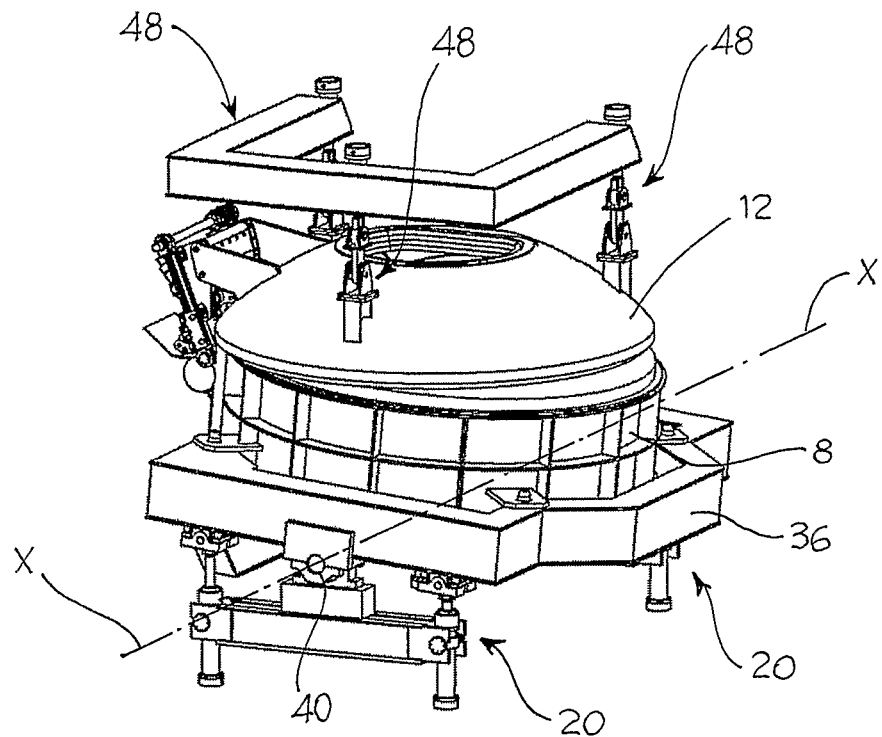
FIG. 9 is a perspective view of the furnace in FIG. 8 in an operational configuration of tapping.
Figure 10:
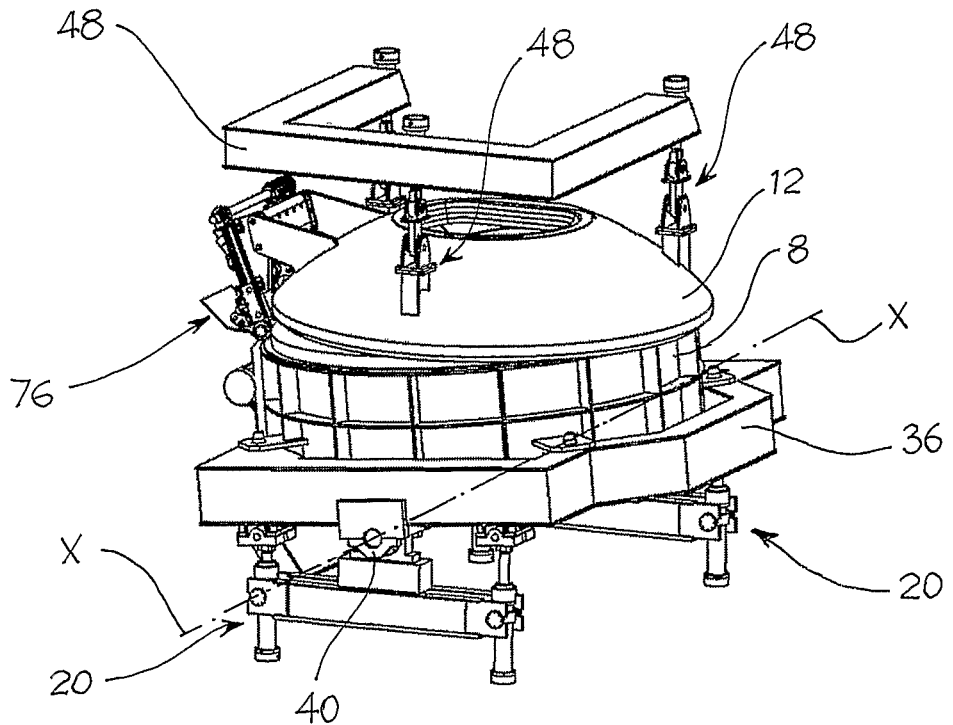
FIG. 10 is a perspective view of the furnace in FIG. 8 in an operational configuration of deslagging.
Figure 11:
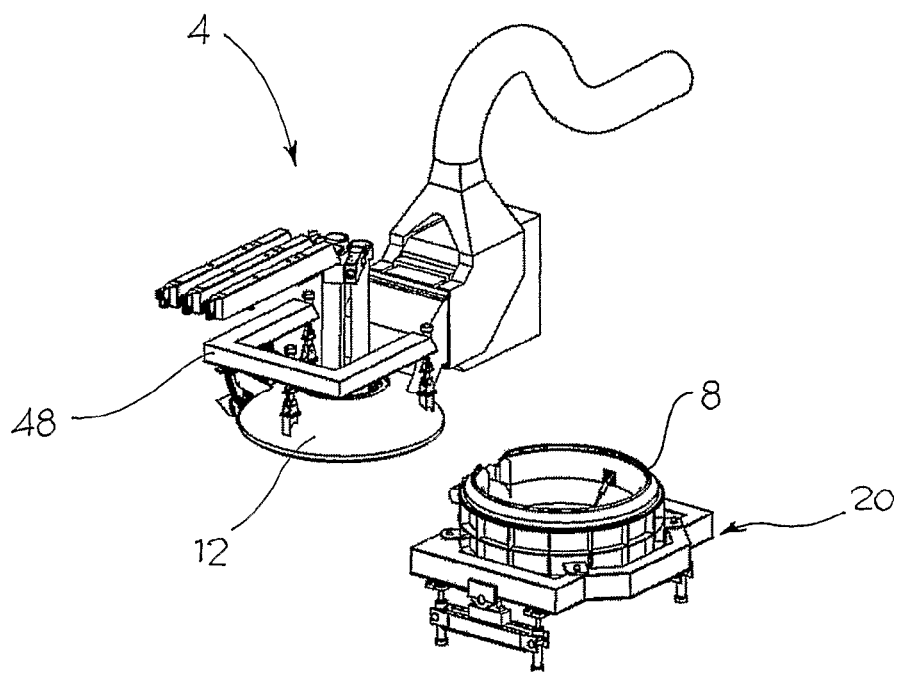
FIG. 11 is a perspective view of the furnace in FIG. 1 in a configuration of roof opening and movement.

Chamber 8 moreover comprises a tapping aperture 68 for tapping molten metal (FIG. 4).

The furnace 4 further comprises a deslagging hatch 76 situated opposite the tapping aperture 68.

Preferably the deslagging hatch is set in correspondence to the roof 12 of furnace 4.

According to one embodiment the deslagging hatch 76 is mounted in such a way as to be opened on the basis of the oscillation of chamber 8; in other words, the deslagging hatch 76 opens automatically when the chamber is tilted for deslagging operations.

Deslagging hatch 76 may also be equipped with controlled activating means for opening and/or closure, independently of the inclination of chamber 8. This mechanism means that deslagging hatch 76 will always keep the deslagging aperture tightly closed.

As may be seen from the foregoing description, the furnace according to this invention overcomes the drawbacks cited with reference to the state of the art.

In fact the fixed roof of the furnace according to the invention enormously simplifies the entire plant engineering and the mechanical interfaces with regard to both the exhaust system and the continuous scrap loading system since there are no longer related movements of the roof.

The exhaust intake can then be located, for example, on the basis of considerations of suction efficiency rather than on kinematic considerations concerning the movements of the roof, as occurs in state of the art furnaces. Substantially, there are limitations regarding the installation position of the exhaust intake. That is to say, there may be two forms of embodiment: in the first the scrap feed hatch coincides with the exhaust intake; in the second embodiment the scrap feed hatch and the exhaust intake are located in distinct positions. In any case, during tapping or deslagging the exhaust conduits of roof and plant remain perfectly aligned, without gases escaping as in traditional furnaces.

Continual loading of the furnace from the roof, made possible by a particular conformation of the plant according to the invention, permits a reduction of energy dispersion by the cooled elements.

Continual loading moreover allows the use of a more stable and regular electric arc in the furnace, at the same time generating a more stable melting process and reducing phenomena of electric mains instability (flicker).

The rotoidal coupling of roof and chamber ensures that the distance between the respective interface surfaces is constant even during rotation of the chamber, thus limiting the dispersion of gases and material from the chamber.

The chamber according to this invention is particularly compact and therefore does not necessarily require the use of cooling panels.

Clearly only some embodiments of the electric furnace according to this invention have been described: a sector expert could carry out all the modifications needed for its adaptation to special applications, yet without going beyond the protection context of the invention as defined by the following claims.

The invention claimed is:

1. An electric arc furnace comprising:
   a chamber for containing molten steel,
   a roof interfacing with and covering the chamber for containing a mass of scrap steel,
   at least one electrode to supply heat for melting the mass of scrap steel, and
   support means for the chamber on a base, the support means for supporting the chamber and allowing oscillation of the chamber around an axis of rotation;
   wherein
   the roof and the chamber are coupled in correspondence to reciprocal interface walls suitable for creating a gastight seal for gases that develop in the chamber during use;
   the axis of rotation of the chamber is horizontal axis of rotation, and
   the roof and the chamber are counterprofiled in correspondence to said interface walls to create a coupling with regard to the axis of rotation of the chamber configured to maintain the roof in a fixed position with respect to the base, the chamber is configured to oscillate about the horizontal axis of rotation to allow continuous scrap loading, tapping and deslagging while the chamber remains closed, the seal is maintained and the roof is configured not to oscillate about horizontal axis of rotation along with the chamber.

2. The furnace according to claim 1 wherein interface walls of the chamber and the roof are separated by a cavity or clearance to accommodate thermal expansions and mechanical deformation.

3. The furnace according to claim 1 further comprising a cutting system for removing slag incrustations from the roof.

4. The furnace according to claim 1 wherein said horizontal axis of rotation is set between the base of the furnace and the interface walls.

5. The furnace according to claim 1 wherein said support means establish a fixed axis of rotation for the chamber during rotation of the chamber itself.

6. The furnace according to claim 1 wherein the support means comprise a perimeter frame which surrounds the chamber and keeps maintains the chamber suspended around the horizontal axis of rotation.

7. The furnace according to claim 6 wherein said perimeter frame comprises a pair of rotating pins mounted on their supports.

8. The furnace according to claim 6 wherein said axis of rotation is set at a height lower than said interface walls, below the perimeter frame.

9. The furnace according to claim 1 wherein said support means support only the chamber while the roof is mechanically independent of said support means.

10. The furnace according to claim 1 comprising motorization suitable for rotating the chamber with regard respect to the support means.

11. The furnace according to claim 10 wherein the motorization comprises at least one cylinder-piston unit operationally connected to the perimeter frame to turn the chamber around said horizontal axis of rotation.

12. The furnace according to claim 1 wherein said chamber can be rotated from a first position, where tapping of the molten steel may be carried out to a second position for deslagging, said positions being inclined in opposite directions with regard to the horizontal axis of rotation of the chamber.

13. The furnace according to claim 1 wherein said roof can be moved from a lowered position for closure of the chamber to a shifted or raised or rotated position to allow insertion into the chamber of a basket of material to be melted.

14. The furnace according to claim 13 wherein said roof is equipped with lifting means suitable for hoisting and/or shifting the said roof relative to the chamber.

15. The furnace according to claim 13 wherein said lifting means comprise hydraulic cylinders and pistons.

16. The furnace according to claim 1 wherein the roof comprises exhaust suction means for conveying gases from the furnace.

17. The furnace according to claim 1 wherein the roof comprises at least one hatch for feeding scrap into the furnace.

18. The furnace according to claim 1 wherein the said chamber is created as a single piece.

19. The furnace according to claim 1 wherein the chamber and the roof have a circular, an elliptical or a pseudo-elliptical form.

20. The furnace according to claim 1 comprising a cage inserted between the chamber and the roof.

21. The furnace according to claim 1 wherein the chamber comprises an aperture for tapping of the molten steel.

22. The furnace according to claim 1 wherein the furnace comprises a deslagging hatch positioned opposite the tapping aperture (68) of the chamber.

23. The furnace, according to claim 22 wherein said deslagging hatch is positioned in correspondence to the roof of the furnace.

24. The furnace according to claim 22 wherein the deslagging hatch is assembled in such a way as to be influenced in opening by oscillation of the chamber.

25. The furnace according to claim 22 further comprising means for opening and closing the deslagging hatch.

26. An electric arc furnace comprising:
- a chamber for containing a mass of metal,
- a roof interfacing with and covering an opening of the chamber,
- at least one electrode at least partially located within the chamber for supplying heat and melting the mass of metal, and
- the chamber being supported by support mechanism, the support mechanism being supported by a base, and the support mechanism configured to support the chamber to as to permit oscillation of the chamber about an axis of rotation;
- wherein the roof and the chamber are coupled to one another by mating interface walls which are suitable for creating a gastight seal therebetween which is configured to prevent escape of gases that develop in the chamber during use;
- the axis of rotation of the chamber is a horizontal axis of rotation which extends parallel to a plane defined by the roof and through opposed sides of the chamber and the support mechanism while the horizontal axis of rotation is spaced from and does not pass through the roof; and
- the roof and the chamber are counterprofiled in correspondence to the interface walls to create a coupling with regard to the horizontal axis of rotation of the chamber configured to maintain the roof in a fixed position relative to the base, the chamber is configured to oscillate about the horizontal axis of rotation relative to the roof, and is configured to permit tapping and deslagging of the chamber, while the chamber remains in a closed position, the roof and the chamber configured to facilitate continuous loading of additional metal into the chamber the seal is maintained, and the roof is configured to not oscillate about the horizontal axis of rotation along with the chamber.

* * * * *